(12) United States Patent
Kongo

(10) Patent No.: US 10,017,888 B2
(45) Date of Patent: Jul. 10, 2018

(54) SEWING DATA GENERATING APPARATUS, SEWING DATA GENERATING METHOD, RECORDING MEDIUM FOR STORING PROGRAM, AND SEWING SYSTEM

(71) Applicant: Janome Sewing Machine Co., Ltd., Tokyo (JP)

(72) Inventor: Takeshi Kongo, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 0 days.

(21) Appl. No.: 15/426,110

(22) Filed: Feb. 7, 2017

(65) Prior Publication Data

US 2017/0306541 A1 Oct. 26, 2017

(30) Foreign Application Priority Data

Apr. 26, 2016 (JP) .................... 2016-088484

(51) Int. Cl.
*D05B 19/08* (2006.01)
*D05C 5/06* (2006.01)
(Continued)

(52) U.S. Cl.
CPC .............. *D05B 19/08* (2013.01); *D05C 5/06* (2013.01); *G06F 3/04847* (2013.01); *G06T 7/60* (2013.01);
(Continued)

(58) Field of Classification Search
CPC ........ D05B 19/08; D05B 19/10; D05B 19/12; D05B 19/16; D05B 19/02; D05C 5/02
(Continued)

(56) References Cited

U.S. PATENT DOCUMENTS 4,998,489 A * 3/1991 Hisatake ................ D05B 19/08
112/103
5,323,722 A * 6/1994 Goto .................. G05B 19/4205
112/102.5
(Continued)

FOREIGN PATENT DOCUMENTS

JP H05-048875 U 6/1993
JP 2014-64660 A 4/2014

*Primary Examiner* — Danny Worrell
(74) *Attorney, Agent, or Firm* — Nakanishi IP Associates, LLC

(57) ABSTRACT

A sewing data generating apparatus acquires information with respect to an embroidery frame. The sewing data generating apparatus acquires an image including a base cloth mounting a sewing target and mounted on the embroidery frame, and analyzes a correspondence between acquired information with respect to the embroidery frame and the image of the embroidery frame thus acquired. The sewing data generating apparatus generates outline data for the sewing target based on the analysis result, and generates sewing data based on the outline data thus generated. The sewing data generating apparatus transmits the sewing data thus generated to a sewing machine. The sewing machine receives the sewing data from the sewing data generating apparatus. The sewing machine executes sewing for the outline of the sewing target according to the sewing data thus received. This allows an applique to be sewn at an accurate position without a need to prepare dedicated data.

12 Claims, 18 Drawing Sheets

(51) Int. Cl.
*G06F 3/0484* (2013.01)
*G06T 7/60* (2017.01)

(52) U.S. Cl.
CPC .................... *G06T 2200/24* (2013.01); *G06T 2207/10004* (2013.01)

(58) Field of Classification Search
USPC .................................................. 700/136–138
See application file for complete search history.

(56) References Cited

U.S. PATENT DOCUMENTS

| | | | | |
|---|---|---|---|---|
| 5,855,176 A * | 1/1999 | Takenoya | D05B 19/08 | 112/102.5 |
| 5,911,182 A * | 6/1999 | Uyama | D05B 19/085 | 112/102.5 |
| 6,263,815 B1 * | 7/2001 | Furudate | D05B 7/00 | 112/470.13 |
| 8,061,286 B2 * | 11/2011 | Hirata | D05C 5/04 | 112/102.5 |
| 8,091,493 B2 * | 1/2012 | Tokura | D05B 19/10 | 112/470.01 |
| 8,301,292 B2 * | 10/2012 | Tokura | D05C 5/06 | 112/470.03 |
| 8,527,083 B2 * | 9/2013 | Tokura | D05B 19/10 | 112/102.5 |
| 8,738,173 B2 * | 5/2014 | Tokura | D05B 19/10 | 700/138 |
| 8,755,926 B2 * | 6/2014 | Naka | D05B 19/12 | 112/470.03 |
| 8,763,541 B2 * | 7/2014 | Tokura | D05C 5/06 | 112/102.5 |
| 8,763,542 B2 * | 7/2014 | Abe | D05B 19/04 | 112/102.5 |
| 8,857,355 B2 * | 10/2014 | Nomura | D05B 19/12 | 112/470.06 |
| 8,948,901 B2 * | 2/2015 | Tokura | D05B 19/08 | 112/102.5 |
| 9,169,588 B2 * | 10/2015 | Tokura | D05B 19/12 | |
| 9,249,533 B2 * | 2/2016 | Imaizumi | D05B 19/10 | |
| 9,267,222 B2 * | 2/2016 | Schnaufer | D05B 19/12 | |
| 9,765,460 B2 * | 9/2017 | Schwarzberger | D05B 19/08 | |
| 2008/0247651 A1 * | 10/2008 | Takaki | G06K 9/4671 | 382/219 |
| 2009/0188413 A1 * | 7/2009 | Hirata | D05B 19/10 | 112/103 |
| 2009/0188414 A1 * | 7/2009 | Tokura | D05B 19/10 | 112/457 |
| 2014/0000498 A1 * | 1/2014 | Yamanashi | D05B 19/12 | 112/102.5 |
| 2014/0083345 A1 | 3/2014 | Tokura | | |
| 2015/0005921 A1 * | 1/2015 | Abe | D05B 19/08 | 700/138 |

\* cited by examiner

# SEWING DATA GENERATING APPARATUS, SEWING DATA GENERATING METHOD, RECORDING MEDIUM FOR STORING PROGRAM, AND SEWING SYSTEM

CROSS REFERENCE TO RELATED APPLICATIONS

This application is based on and claims the benefit of priority to Japanese Patent Application No. 2016-088484 filed on Apr. 26, 2016, the contents of which are hereby incorporated by reference in their entirety.

BACKGROUND OF INVENTION

Field of the Invention

The present invention relates to a sewing data generating apparatus, a sewing data generating method, a recording medium for storing a program, and a sewing system.

Description of the Related Art

A sewing machine is known, having a function of providing applique based on applique embroidery data. For example, such applique embroidery data is prepared including multiple kinds of applique stitching patterns. First, the user stretches an applique cloth material over an embroidery frame mounted on a sewing machine. In this state, the sewing machine forms a stitching pattern based on the first data such that it functions as a mark for cutting an applique cloth from the applique cloth material. Next, the user mounts a base cloth on the embroidery frame. In this state, the sewing machine forms stitching based on the second data such that it functions as a mark for position alignment between the applique cloth and the base cloth. After the user accurately cuts the applique cloth from the applique cloth material, the user temporarily bonds the applique cloth to the base cloth using an adhesive or the like such that it is located at a position indicated by the stitching formed as a mark on the base cloth. Lastly, the sewing machine sews the applique cloth to the base cloth based on the first data. Such a technique has been disclosed, which allows a sewing machine to provide applique sewing (see Patent document 1, for example).

Also, another technique has been disclosed (see Patent document 2, for example). That is to say, instead of forming such stitching on the base cloth for position alignment, a small alignment mark is placed on the applique cloth after the applique cloth has been temporarily bonded to the base cloth. In this state, a camera mounted on a sewing machine acquires an image of the applique cloth and the mark, and calculates the position and the angle of the mark based on the image data. Next, the third data to be used by the user to perform applique sewing is corrected based on the position and the angle of the mark. That is to say, the third data is converted such that the position of the applique cloth matches the position indicated by the third data. This allows the sewing machine to sew the applique cloth to the base cloth.

RELATED ART DOCUMENTS

Patent Documents

[Patent Document 1]
Japanese Utility Model Application Laid-Open No. H05-48875

[Patent Document 2]
Japanese Patent Application Laid-Open No. 2014-64660

However, with the techniques described in Patent documents 1 and 2, such an arrangement requires dedicated embroidery data to be prepared beforehand. This leads to an issue in that the applique is limited to the patterns prepared beforehand.

That is to say, with the technique described in Patent document 1, such an arrangement requires the first data that provides a mark for cutting an applique from an applique cloth material, the second data used for alignment of the applique cloth, and the third data used to sew the applique cloth to the base cloth.

Furthermore, with the technique described in Patent document 2, such an arrangement requires the first data that provides a mark used for cutting an applique from an applique cloth material and the third data used to sew the applique cloth to the base cloth. Furthermore, such an arrangement requires the user to accurately cut the applique cloth from the applique material cloth. In a case in which the user desires an applique having a different shape, the user must generate (input) new dedicated data again.

Moreover, with the techniques described in Patent documents 1 and 2, in a case in which an applique cloth cut in a user's desired shape is sewn to a base cloth, the user must use a zig-zag stitching function or an over-edge stitching function supported by an ordinary sewing machine instead of the function of an embroidery sewing machine. That is to say, in this case, the user must perform zig-zag stitching or over-edge stitching in a state in which the user holds the cloth by hand while delicately adjusting the sewing direction along the entire outline of the applique cloth.

SUMMARY OF INVENTION

Accordingly, one or more embodiments of the invention have been made in order to address the aforementioned issue. It is a purpose of the present invention to provide a sewing data generating apparatus, a sewing data generating method, a recording medium for storing a program, and a sewing system, configured to allow an applique to be accurately sewn at a given position without a need to prepare dedicated data beforehand.

Embodiment (1)

One or more embodiments of the invention provide a sewing data generating apparatus. The sewing data generating apparatus comprises: an image acquisition unit that acquires an image of an embroidery frame and a sewing target mounted on a base cloth mounted on the embroidery frame; an acquired image analyzing unit that analyzes the image acquired by the image acquisition unit based on a correspondence between information with respect to the embroidery frame and information with respect to the image of the embroidery frame acquired by the image acquisition unit; and an outline data generating unit that generates outline data for the sewing target analyzed by the acquired image analyzing unit.

Embodiment (2)

One or more embodiments of the invention provide the sewing data generating apparatus comprising a sewing data generating unit that generates sewing data for the sewing target based on the outline data generated by the outline data generating unit.

Embodiment (3)

One or more embodiments of the invention provide the sewing data generating apparatus comprising an embroidery frame information acquisition unit that acquires information with respect to the embroidery frame.

Embodiment (4)

One or more embodiments of the invention provide the sewing data generating apparatus comprising a transmission unit that transmits the sewing data, which is generated by the sewing data generating unit for the sewing target, to a sewing machine.

Embodiment (5)

One or more embodiments of the invention provide the sewing data generating apparatus. The sewing data generating apparatus comprises: a display control unit that instructs a display unit to display a reference frame image that corresponds to the embroidery frame based on the information with respect to the embroidery frame acquired by the embroidery frame information acquisition unit; and an operation guidance unit that instructs a user to acquire an image in a state in which the reference frame image that corresponds to the embroidery frame displayed on the display unit is aligned with an image of the embroidery frame acquired via the image acquisition unit and displayed on the display unit. The acquired image analyzing unit analyzes a correspondence between the information with respect to the embroidery frame and the information with respect to the image of the embroidery frame in a state in which the reference frame image that corresponds to the embroidery frame is aligned with the image of the embroidery frame acquired by the image acquisition unit.

Embodiment (6)

One or more embodiments of the invention provide the sewing data generating apparatus. With such an arrangement, the reference frame image that corresponds to the embroidery frame is displayed on the display unit in a semi-transparent manner.

Embodiment (7)

One or more embodiments of the invention provide the sewing data generating apparatus. With such an arrangement, the operation guidance unit provides at least one from among a guidance display and an audio guidance.

Embodiment (8)

One or more embodiments of the invention provide the sewing data generating apparatus comprising a control unit. With such an arrangement, the control unit performs a control operation so as to instruct the image acquisition unit to automatically acquire an image at a time point at which judgement has been made that the image of the embroidery frame is aligned with the reference frame image that corresponds to the embroidery frame.

Embodiment (9)

One or more embodiments of the invention provide the sewing data generating apparatus. With such an arrangement, the outline data generating unit performs image processing on an image including the embroidery frame and the sewing target mounted on the base cloth mounted on the embroidery frame acquired by the image acquisition unit, so as to generate outline data for the sewing target.

Embodiment (10)

One or more embodiments of the invention provide the sewing data generating apparatus comprising a sewing data confirmation unit that instructs the display unit to display an image of the sewing target acquired by the image acquisition unit and a planned sewing line generated based on the sewing data generated by the sewing data generating unit.

Embodiment (11)

One or more embodiments of the invention provide the sewing data generating apparatus. With such an arrangement, the sewing data confirmation unit displays the planned sewing line in a color that can be easily identified visually with respect to colors in the image including the sewing target.

Embodiment (12)

One or more embodiments of the invention provide the sewing data generating apparatus comprising an editing unit that edits the outline data according to an operation by a user.

Embodiment (13)

One or more embodiments of the invention provide a sewing data generating method employed in a sewing data generating apparatus comprising an image acquisition unit, an acquired image analyzing unit, and an outline data generating unit. The sewing data generating method comprises: acquiring, by the image acquisition unit, an image of an embroidery frame and a sewing target mounted on a base cloth mounted on the embroidery frame; analyzing, by the acquired image analyzing unit, the image acquired by the image acquisition unit based on a correspondence between information with respect to the embroidery frame and information with respect to the image of the embroidery frame acquired by the image acquisition unit; and generating, by the outline data generating unit, the outline data for the sewing target analyzed by the acquired image analyzing unit.

Embodiment (14)

One or more embodiments of the invention provide a recording medium for storing a program configured to instruct a sewing data generating apparatus to execute a sewing data generating method employed in the sewing data generating apparatus comprising an image acquisition unit, an acquired image analyzing unit, and an outline data generating unit. The sewing data generating method comprises: acquiring, the image acquisition unit, an image of an embroidery frame and a sewing target mounted on a base cloth mounted on the embroidery frame; analyzing, by the acquired image analyzing unit, the image acquired by the image acquisition unit based on a correspondence between information with respect to the embroidery frame and information with respect to the image of the embroidery frame acquired by the image acquisition unit; and generating, by the outline data generating unit, the outline data for the sewing target analyzed by the acquired image analyzing unit.

Embodiment (15)

One or more embodiments of the invention provide a sewing system comprising a sewing data generating apparatus and a sewing machine. With such an arrangement, the sewing data generating apparatus comprises: an image acquisition unit that acquires an image of an embroidery frame and a sewing target mounted on a base cloth mounted on the embroidery frame; an acquired image analyzing unit that analyzes the image acquired by the image acquisition unit based on a correspondence between information with respect to the embroidery frame and information with respect to the image of the embroidery frame acquired by the image acquisition unit; an outline data generating unit that generates outline data for the sewing target analyzed by the acquired image analyzing unit; and a transmission unit that transmits, to the sewing machine, the outline data generated by the outline data generating unit or otherwise sewing data for the sewing target generated based on the outline data. The sewing machine comprises: a reception unit that receives the outline data or otherwise the sewing data transmitted from the transmission unit; and a sewing operation execution unit that executes sewing for the outline of the sewing target according to the outline data or otherwise the sewing data received by the reception unit.

With at least one embodiment of the present invention, such an arrangement has an advantage of allowing an applique to be sewn at an accurate position without a need to prepare dedicated data beforehand. Thus, such an arrangement supports an applique design freely cut by the user as well as an applique intentionally cut by the user with a different design, thereby providing an improved degree of freedom in sewing.

DETAILED DESCRIPTION

Figure 1:
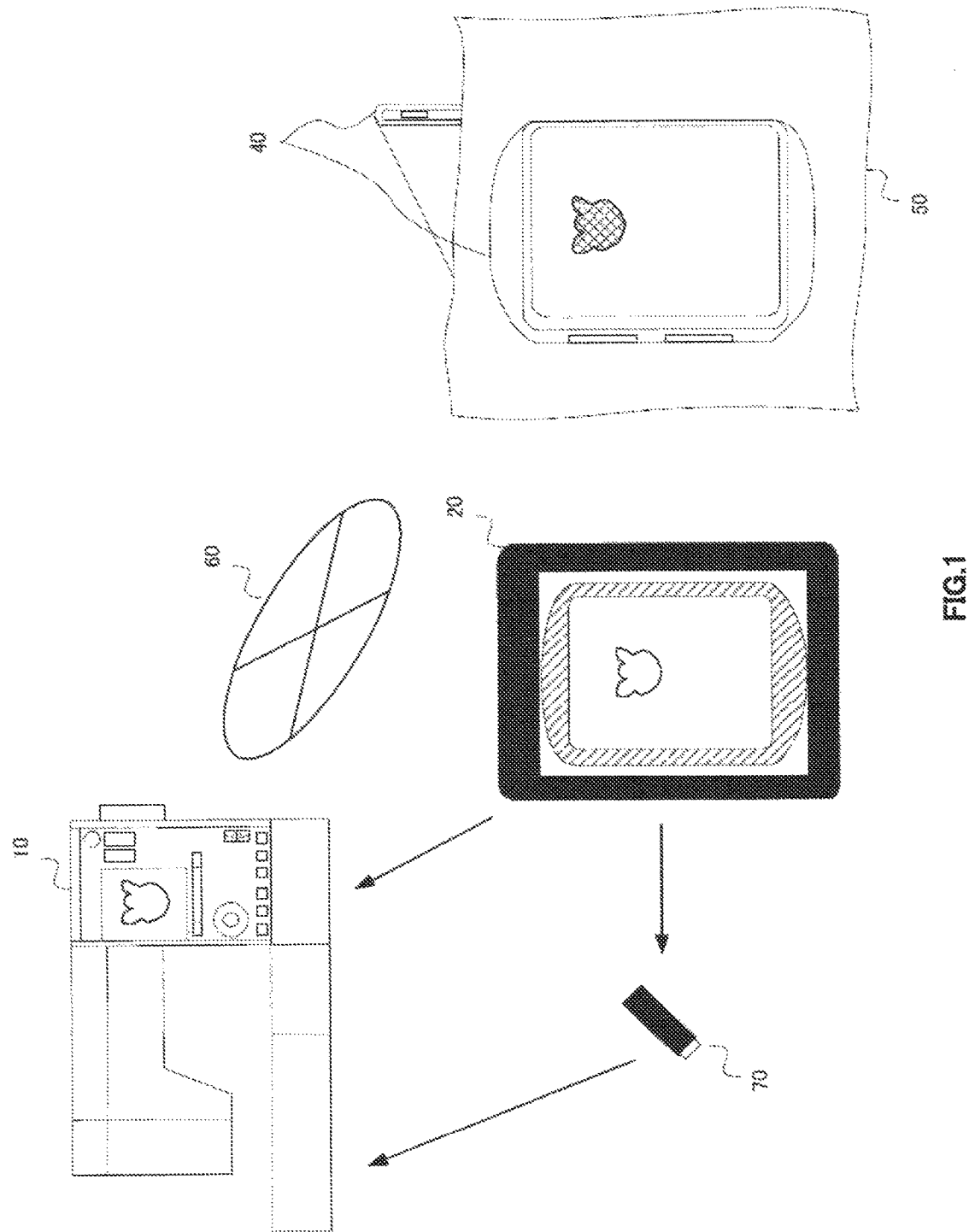
FIG. 1 is a diagram showing a schematic configuration of a sewing system according to a first embodiment of the present invention.

Detailed description will be made regarding an embodiment of the present invention with reference to the drawings.
[First Embodiment]
Description will be made with reference to FIGS. 1 through 14 regarding a sewing system according to a first embodiment.
[Configuration of the Sewing System]
As shown in FIG. 1, the sewing system according to the present embodiment is configured including a sewing machine 10 and a tablet terminal 20 configured as a sewing data generating apparatus. The sewing machine 10 and the tablet terminal 20 are connected to each other via a network such as a wireless LAN 60 or the like. It should be noted that the present embodiment is not restricted to such an arrangement employing such a network such as the wireless LAN 60 or the like. For example, a communication system may be employed using Bluetooth (trademark). Also, an off-line communication system may be employed using USB memory 70 or the like, for example.

With the sewing system according to the present embodiment, after an applique cloth cut by the user in a desired shape has been temporarily bonded to a base cloth, the base cloth is stretched over an embroidery frame having a known size. In this state, the user acquires an image of the base cloth using the tablet terminal 20 having an image acquisition function, for example. Next, the size of the applique cloth and its position within the embroidery frame are calculated based on the relation between the embroidery frame having a known size, the base cloth stretched over the embroidery frame, and the applique cloth temporarily bonded to the base cloth. Subsequently, the sewing data to be used for applique sewing is generated based on the size of the actual applique cloth and its position within the embroidery frame thus calculated. Detailed description thereof will be made below.

Figure 2:
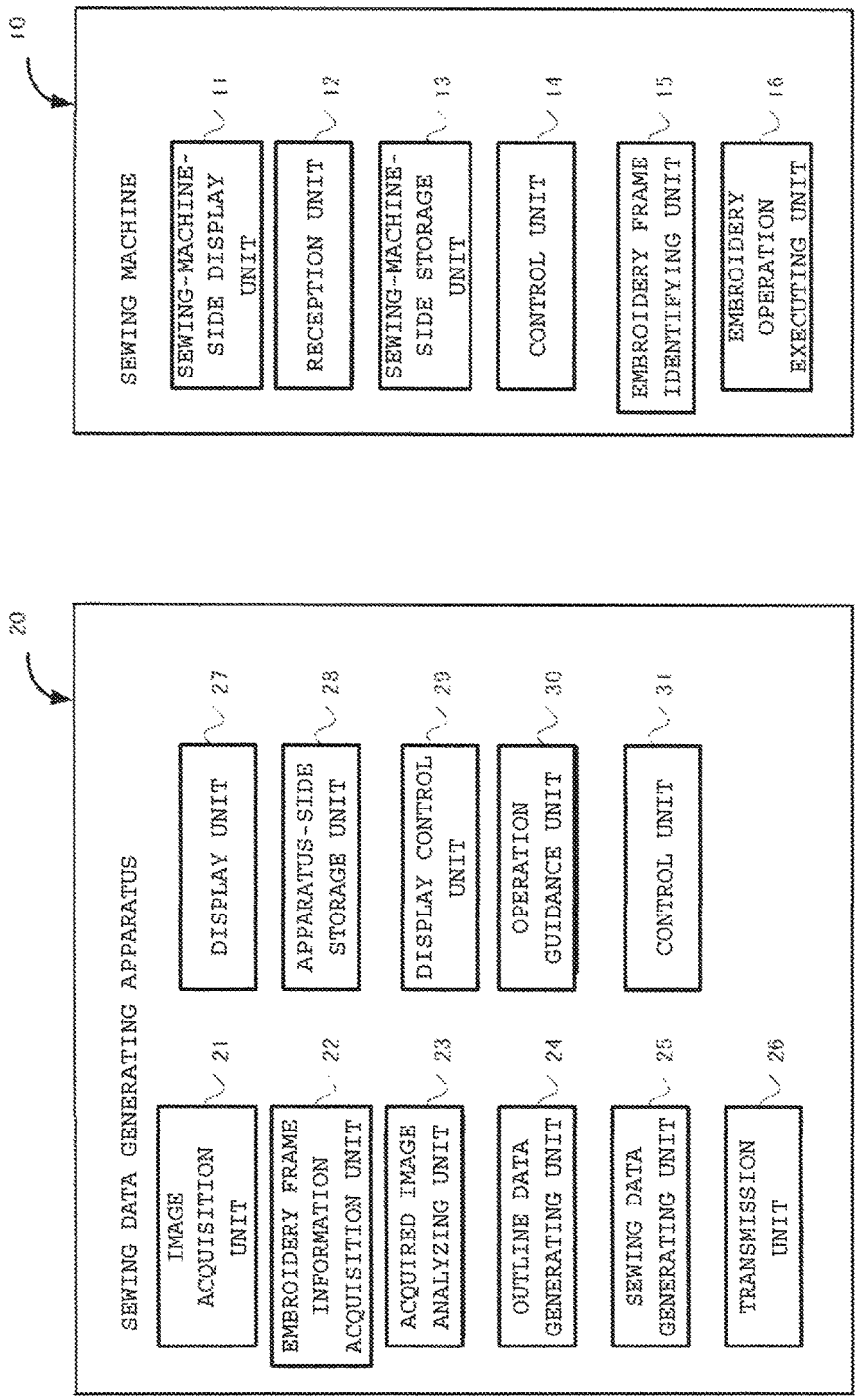
FIG. 2 is a diagram showing an electrical configuration of the sewing system according to the first embodiment of the present invention.

As shown in FIG. 2, the sewing machine 10 comprises a sewing-machine-side display unit 11, a reception unit 12, a sewing-machine-side storage unit 13, a sewing-machine-side control unit 14, an embroidery frame identifying unit 15, and an embroidery operation executing unit 16. Here, the sewing machine 10 provides semi-automatic embroidery using multiple threads having different colors according to the embroidery data, for example. In addition, the sewing machine 10 is configured as a multi-function sewing machine that supports ordinary sewing according to various kinds of sewing patterns.

The sewing-machine-side display unit 11 is provided to the sewing machine 10 itself. For example, the sewing machine-side-display unit 11 is configured as a liquid crystal display apparatus. The sewing-machine-side display unit 11 displays various kinds of information useful for the user according to the sewing machine operating state. For example, in a threading operation, the sewing-machine-side display unit 11 displays content for assisting the user to perform the threading operation. The sewing machine 10 is configured as a multi-function sewing machine. Accordingly, various kinds of content to be displayed are prepared. Also, the sewing-machine-side display unit 11 is configured as a touch panel to allow the user to input various operation instructions.

The reception unit 12 is connected to the tablet terminal 20 via the wireless LAN 60. This enables bidirectional communication between the sewing machine 10 and the tablet terminal 10 via an unshown router or the like. It should be noted that the present invention is not restricted to such an arrangement employing a network such as the wireless LAN 60 or the like. For example, a communication system may be employed using Bluetooth (trademark). Also, an off-line communication system may be employed using USB memory 70 or the like, for example.

The sewing-machine-side storage unit 13 is configured as ROM (Read Only Memory), RAM (Random Access Memory), flash memory, or the like, and stores several hundred kinds of embroidery design data, for example. Also, in addition to the designs (embroidery design data) and the information with respect to the embroidery frame stored beforehand in the sewing machine 10, the sewing-machine-side storage unit 13 may store additional designs or the like (user-prepared designs) which are obtained by the user from external data. Also, the sewing-machine-side storage unit 13 is configured to allow the data stored in it, such as the embroidery design data, the information relating to the embroidery design data, and the information with respect to the embroidery frame, to be transmitted to the tablet terminal 20.

The sewing-machine-side control unit 14 controls the operation of the sewing machine 10 according to the control program. Furthermore, the sewing-machine-side control unit 14 performs a response operation according to an inquiry from the tablet terminal 20. In addition, the sewing-machine-side control unit 14 is capable of performing a control operation so as to allow the user to perform simple data editing operations such as selection, mixing, transformation, etc., on the embroidery designs using the sewing machine 10 itself with the display function and the input function of the sewing-machine-side display unit 11.

The embroidery frame identifying unit 15 identifies the kind of the embroidery frame 40 mounted on the sewing machine 10. The embroidery frame identifying unit 15 according to the present embodiment identifies the kind of the embroidery frame 40 mounted on the sewing machine 10 by way of the kind of the embroidery frame input or otherwise selected by the user via the sewing-machine-side display unit 11. It should be noted that the embroidery frame identifying method used by the embroidery frame identifying unit 15 is not restricted to such an arrangement. Also, the kind of the embroidery frame 40 mounted on the sewing machine 10 may be identified using an IC chip or a contact circuit.

The embroidery operation executing unit 16 executes an embroidery operation on the outline of a sewing target (e.g., applique cloth) mounted on a base cloth mounted on the embroidery frame 40 according to the sewing data received from the sewing data generating unit 25 via the reception unit 12.

The tablet terminal 20 may be configured as a commercially available general-purpose tablet terminal. Before such a tablet terminal 20 is used as the sewing data generating apparatus according to the present embodiment, a program for supporting the sewing system (an application program) is installed on the tablet terminal 20. It should be noted that such an issue may be recorded on a recording medium such as a flash memory device or the like. Also, such an issue may be obtained by downloading via various kinds of known networks. It should be noted that description is being made in the present embodiment regarding such a tablet terminal 20 as a specific example of the sewing data generating apparatus. However, the present invention is not restricted to such an arrangement. Also, a smartphone may be employed, for example. Alternatively, a camera or the like having a function required to function as the sewing data generating apparatus may be employed, which is mounted on the sewing machine 10 by means of a mechanism that allows it to be fixedly mounted at a position where it can acquire an image of the overall area of the embroidery frame.

As shown in FIG. 2, the tablet terminal 20 comprises an image acquisition unit 21, an embroidery frame information acquisition unit 22, an acquired image analyzing unit 23, an outline data generating unit 24, a sewing data generating unit 25, a transmission unit 26, a display unit 27, an apparatus-side storage unit 28, a display control unit 29, an operation guidance unit 30, and an apparatus-side control unit 31.

The image acquisition unit 21 acquires an image including the embroidery frame 40 and the base cloth mounting the sewing target and mounted on the embroidery frame 40. In actuality, the user performs image acquisition using the tablet terminal 20 held in the user's hands.

The embroidery frame information acquisition unit 21 acquires the information with respect to the embroidery frame 40 to be used in embroidery. The acquired image analyzing unit 23 performs image analysis so as to obtain the correspondence between the information with respect to the embroidery frame 40 acquired by the embroidery frame information acquisition unit 22 and the image of the embroidery frame acquired by the image acquisition unit 21. Specifically, the acquired image analyzing unit 23 analyzes the correspondence between the information with respect to the embroidery frame 40 and the embroidery frame in the form of an acquired image in a state in which a display that corresponds to the embroidery frame 40 is aligned with the image of the embroidery frame input via the image acquisition unit 21.

The outline data generating unit 24 generates the outline data of the embroidery target based on the analysis result obtained by the acquired image analyzing unit 23. Specifically, after the image acquisition unit 21 acquires an image such that it includes at least the embroidery frame and the base cloth mounted on the embroidery frame and mounting the sewing target, the outline data generating unit 24 performs image processing on the image thus acquired, in order to generate the outline data of the sewing target.

The sewing data generating unit 25 generates the sewing data based on the outline data generated by the outline data generating unit 24. The transmission unit 26 transmits the sewing data thus generated by the sewing data generating unit 25 to the sewing machine 10. It should be noted that description is being made in the present embodiment for exemplary purposes regarding an arrangement in which the tablet terminal 20 (sewing data generating apparatus) generates the sewing data as its final data. Also, an arrangement may be made in which the tablet terminal 20 (sewing data generating apparatus) generates the outline data as its final data and transmits the outline data thus generated to the sewing machine 10, following which the sewing machine 10 generates the sewing data based on the outline data received from the tablet terminal 20.

The display unit 27 displays various kinds of images, and is configured including an unshown operating unit having a function as a touch panel. In addition to a function of displaying information, such an arrangement allows the user to input various kinds of operating instructions. In the present embodiment, the display unit 27 displays a display that corresponds to the embroidery frame in a semi-transparent manner based on the information with respect to the embroidery frame 40 acquired by the embroidery frame information acquisition unit 22.

The apparatus-side storage unit 28 is configured as ROM (Read Only Memory), RAM (Random Access Memory), flash memory, or the like. For example, the apparatus-side storage unit 28 stores the image data acquired by the image acquisition unit 21 and various kinds of data acquired from the sewing machine 10. It should be noted that, in the present embodiment, the apparatus-side storage unit 28 stores the embroidery frame information, outline data, sewing data, operation guidance program, audio data, display data, and the like.

The display control unit 29 controls the display operation of the display unit 27. Specifically, the display control unit 29 displays a display that corresponds to the embroidery frame in a semi-transparent manner based on the information with respect to the embroidery frame 40 acquired by the embroidery frame information acquisition unit 22 and a video image input via the image acquisition unit 21 such that they are superimposed on each other.

The operation guidance unit 30 provides the user with image acquisition guidance so as to instruct the user to perform image acquisition in a state in which the display that corresponds to the embroidery frame is aligned with the video image of the embroidery frame input via the image acquisition unit 21. Furthermore, in this operation, the operation guidance unit 30 performs operation guidance in the form of guidance display or otherwise audio guidance.

The apparatus-side control unit 31 controls the operation of the tablet terminal 20 according to the control program. Specifically, the apparatus-side control unit 31 instructs the display control unit 29 to display a display that corresponds to the embroidery frame based on the information with respect to the embroidery frame 40 acquired by the embroidery frame information acquisition unit 22. Furthermore, the apparatus-side control unit 31 controls the image acquisition unit 21 so as to automatically perform image acquisition at the time point at which judgement has been made that the display that corresponds to the embroidery frame 40 is aligned with the embroidery frame in the acquired image.

[Operation of the Sewing System]

Description will be made with reference to FIGS. 3 through 14 regarding the operation of the sewing system according to the present embodiment.

[Advance Preparation]

As advance preparation, first, the user cuts an applique cloth (see FIG. 4) in a desired shape from an applique material cloth. Next, the user temporarily bonds the applique cloth thus cut to the base cloth 50 such that it is located at a desired position and a desired angle. Furthermore, the user mounts the base cloth on an embroidery frame 40 having an appropriate size. It should be noted that the base cloth may be mounted at a desired position and desired angle of rotation.

Figure 7:
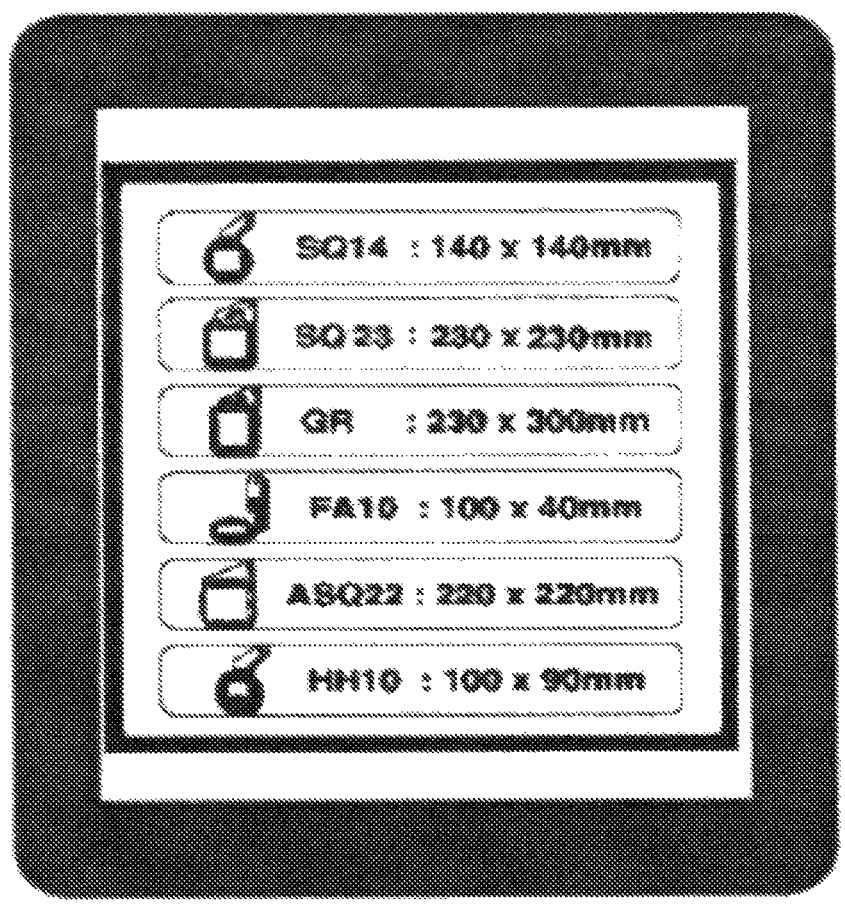
FIG. 7 is a diagram showing an example state according to the first embodiment of the present invention in which a sewing data generating apparatus displays multiple kinds of embroidery frames on its display screen in order to allow the user to select the embroidery frame for mounting a base cloth to which an applique cloth has been temporarily bonded.

Upon starting up the sewing application installed on the tablet terminal 20, the embroidery frame information acquisition unit 22 requests the user to input information with respect to the kind of the embroidery frame 40 mounting the base cloth 50 (Step S101). Specifically, the embroidery frame information acquisition unit 22 displays a list as shown in FIG. 7, and identifies the kind of the embroidery frame 40 to be used in embroidery by way of the kind of the embroidery frame selected by the user from the items on the list. Description will be made below regarding a case in which the frame type GR is selected. It should be noted that the apparatus-side storage unit 28 stores the data such as the size of various kinds of the embroidery frame 40. Also, such data may be acquired via communication with the sewing machine 10 or otherwise a server or the like connected to different networks. It should be noted that description has been made above regarding an arrangement in which the user specifies the kind of the embroidery frame 40. Also, the embroidery frame information acquisition unit 22 may identify the kind of the embroidery frame 40 to be used in embroidery based on the image acquired by the image acquisition unit 21, and may acquire the information with respect to the embroidery frame 40 thus identified. For example, the image acquired by the image acquisition unit 21 may be analyzed so as to identify the kind of the embroidery frame 40 based on the shape of the embroidery frame 40 in the acquired image. Also, image recognition may be performed for a text, barcode, or the like, provided on the embroidery frame 40, so as to identify the kind of the embroidery frame 40.

Figure 8:
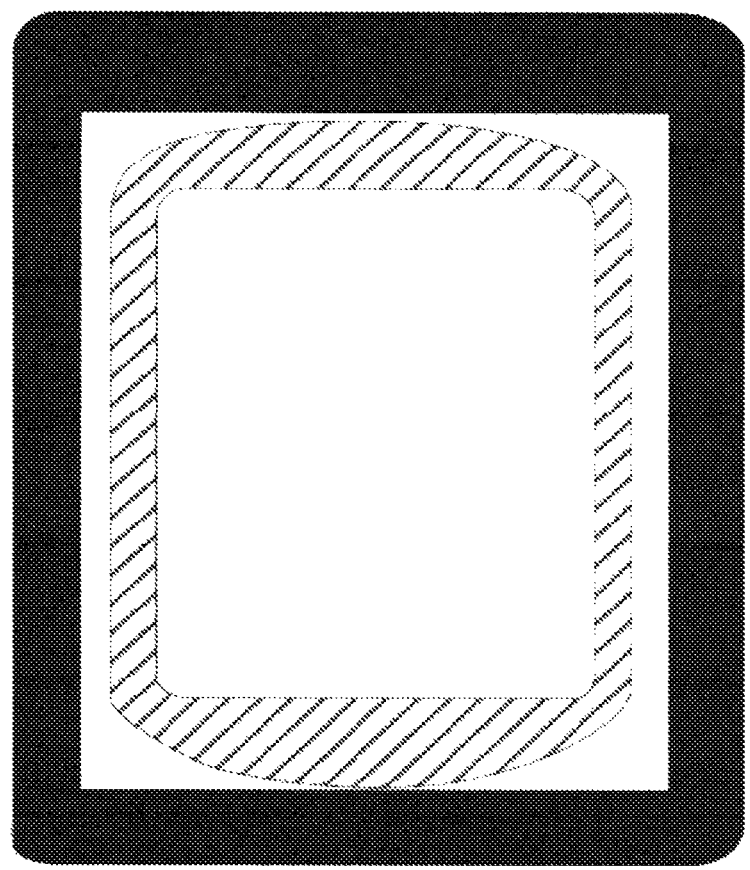
FIG. 8 is a diagram showing an example state according to the first embodiment of the present invention in which the sewing data generating apparatus displays the embroidery frame on its display screen after the selection of the embroidery frame to be used to mount the base cloth to which the applique cloth has been temporarily bonded.
Figure 9:
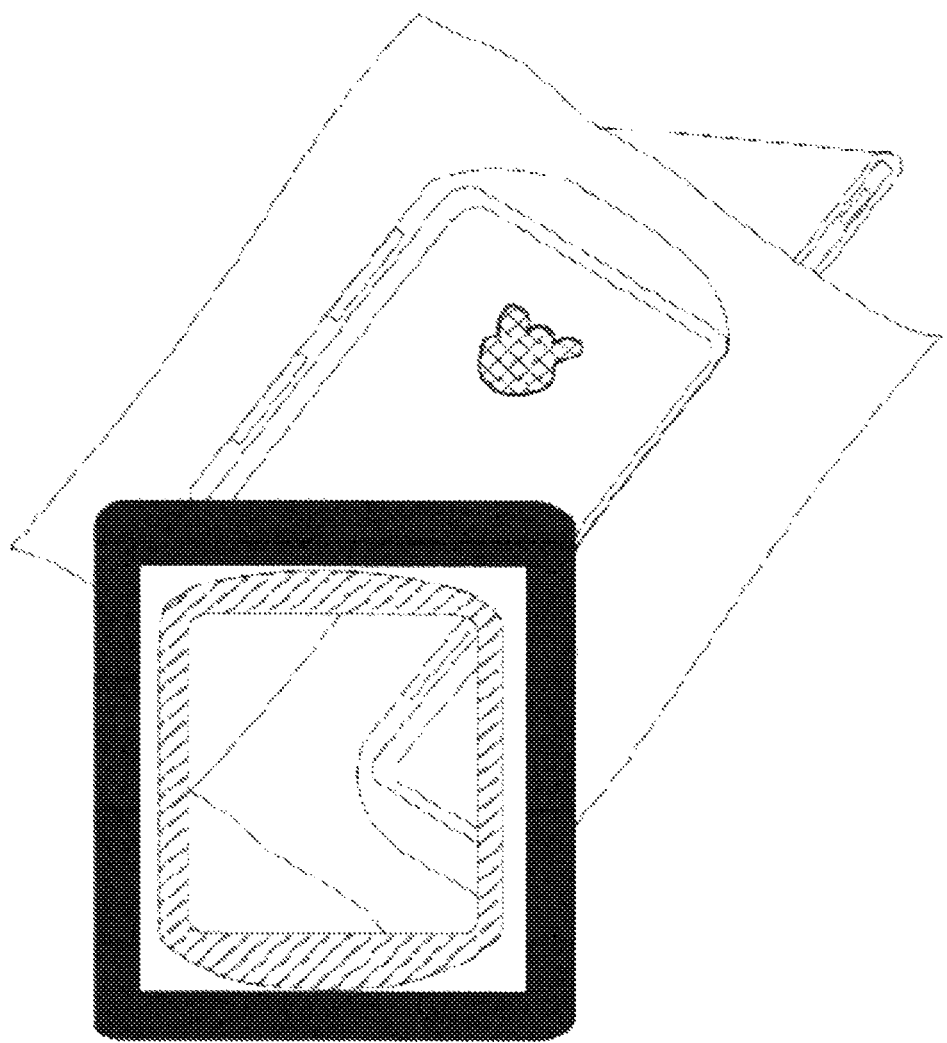
FIG. 9 is a diagram showing an example state of an alignment operation performed before image acquisition in a state in which alignment is obtained between the reference frame image of the embroidery frame thus selected and the actual embroidery frame to which the applique cloth has been temporarily bonded.
Figure 10:
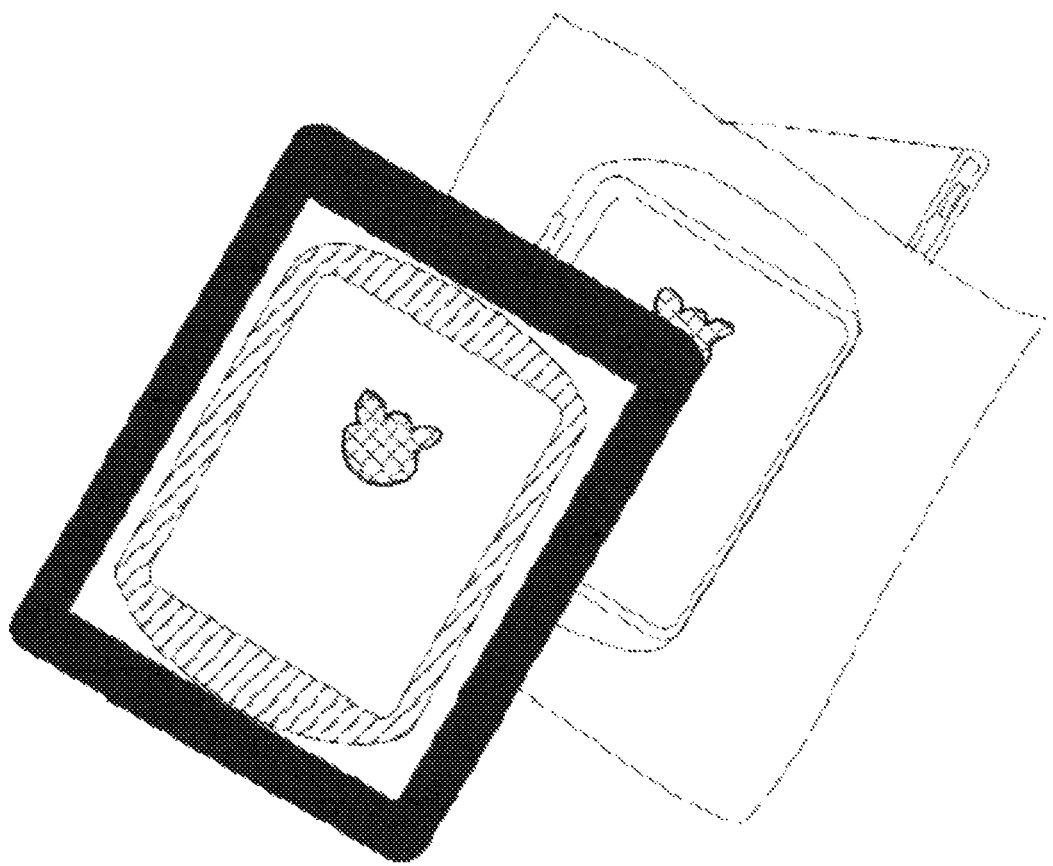
FIG. 10 is a diagram showing an example state in which alignment has been obtained between the reference frame image of the embroidery frame thus selected and the actual embroidery frame to which the applique cloth has been temporarily bonded.
Figure 11:
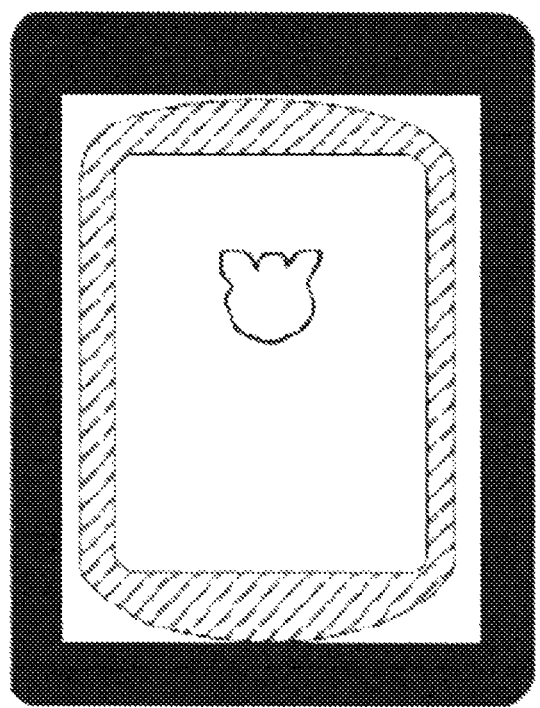
FIG. 11 is a diagram showing an example state in which an outline of the applique cloth is displayed after the outline is extracted by means of image processing according to the first embodiment of the present invention.
Figure 12:
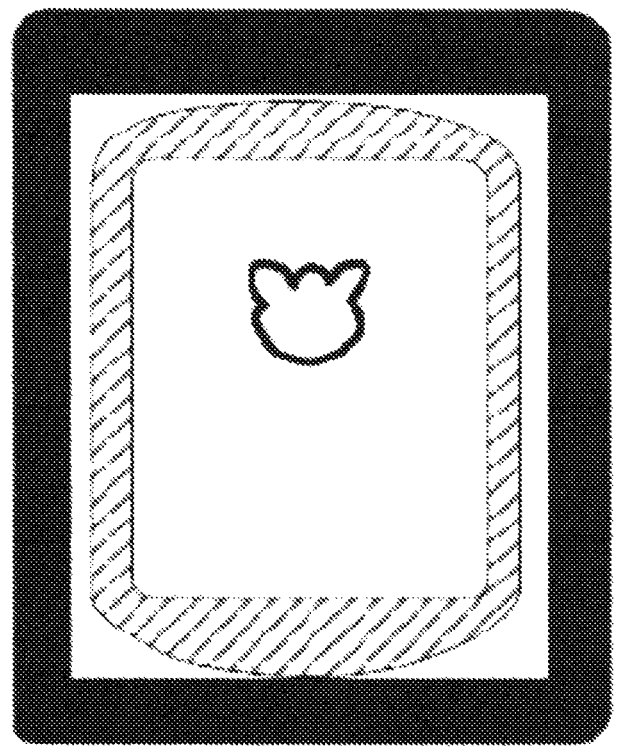
FIG. 12 is a diagram showing an example state according to the first embodiment of the present invention in which sewing data is generated after the outline of the applique cloth is determined.

As shown in FIG. 8, the display control unit 29 displays a frame image of the embroidery frame 40 selected in Step S101 in a semi-transparent manner so as to allow the background to be viewed (Step S102). For example, in a case of selecting the frame type GR, the embroidery frame 40 has a size of 230 mm×300 mm. Here, let us consider a case in which the tablet terminal 20 to be used here is configured to have a display size of 1563 dots×2048 dots and a display resolution of 264 dpi. In this case, a part of the display area having a size of 1000 dots×1300 dots may be preferably assigned to the embroidery area. That is to say, the image may preferably be displayed with a spatial resolution of 0.23 mm/dot. It should be noted that the kind of the embroidery frame is known, and accordingly, the size of the embroidery frame is known. Thus, in the image acquired by the image acquisition unit 21, the size of the applique cloth can be accurately calculated based on the image of the embroidery frame acquired together with the applique cloth.

The camera function of the tablet terminal 20 is started up. In this stage, the display unit 27 of the tablet terminal 20 displays a video image input via the image acquisition unit 21 on its screen. Next, the user adjusts the image acquisition region such that a reference frame image displayed in a transparent manner is aligned with the outline of the embroidery frame 40 mounting the base cloth 50 in a video image acquired by the image acquisition unit 21, e.g., such that the state is changed from the state shown in FIG. 9 to the state shown in FIG. 10 (Step S103). Such image region adjustment may be performed by adjusting the camera position (position of the tablet terminal 20). In a case in which the camera unit has a zoom function, the image region adjustment may be performed using the zoom function. Also, marks may be formed at the corner portions of the embroidery frame. In this case, the position of the tablet terminal 20 may be adjusted such that the marks in a video image thus acquired are aligned with the corresponding marks in the reference embroidery frame image displayed on the tablet terminal 20. It should be noted that, in this stage, the operation guidance unit 30 is started up, and assists the user by means of a guidance display or otherwise audio guidance to perform the position adjustment such that the reference frame image displayed in a transparent manner is aligned with the outline of the embroidery frame 40 mounting the base cloth 50 thus acquired in the form of an image by the image acquisition unit 21. By providing such a guidance function, such an arrangement allows the user to perform position alignment in a short period of time between the reference frame image and the outline of the embroidery image 40 mounting the base cloth 50 thus acquired in the form of an image.

When the user has judged that the reference frame image displayed in a transparent manner is aligned with the outline of the embroidery frame 40 mounting the base cloth 50 in a video image acquired by the image acquisition unit 21, the user performs an operation so as to instruct the image acquisition unit 21 to execute image acquisition (Step S104). It should be noted that, when judgement has been made by means of image recognition that the reference frame image is aligned with the outline of the embroidery frame mounting the base cloth in a video image acquired by the camera, the image acquisition may be automatically performed. By implementing such an automatic image acquisition function, such an arrangement is capable of accurately acquiring an image without involving the effects of camera shake or the like. The acquired image analyzing unit 23 analyzes the correspondence between the information with respect to the embroidery frame 40 acquired in Step S101 and the embroidery frame in the image acquired in Step S104. The image of the background is also acquired with the same scale as that of the frame image. Thus, the image of the background may preferably be generated with a spatial resolution of 0.23 mm/dot in the same way as with the reference frame image as described above, thereby allowing the analysis result to be calculated in a simple manner. In this state, the apparatus-side storage unit 28 stores the image data of the embroidery frame 40 mounting the base cloth 50 displayed as the background image on the editor screen. The acquired image analyzing unit 23 acquires the correspondence between the information with respect to the embroidery frame 40 and the embroidery frame in the acquired image assuming that the image has been acquired by the image acquisition unit 21 in a state in which the embroidery frame 40 in the video image is aligned with the reference frame image such that they match each other. When the embroidery frame 40 in the video image is aligned with the reference frame image such that they match each other, such an arrangement is capable of acquiring the correspondence between the acquired image and the actual scale based on the information with respect to the embroidery frame 40 acquired by the embroidery frame information acquisition unit 22 using the fact that the size of the embroidery frame 40 is known.

After the image acquisition unit 21 executes image acquisition, the acquired image is displayed on the display unit 27 (Step S105). The user touches an area of the applique cloth displayed in the form of an image on the display unit 27 in order to specify the applique cloth area to be extracted (Step S106). After the user touches the applique cloth area to be extracted, the outline data generating unit 24 is started up. The outline data generating unit 24 performs first derivation processing on the image data of the applique cloth so as to calculate difference data in the X-direction (e.g., the horizontal axis direction in FIG. 11), Y-direction (e.g., the vertical axis direction in FIG. 11), or the oblique direction. Furthermore, the outline data generating unit 24 extracts the outline of the applique cloth (Step S107). Moreover, the outline data generating unit 24 performs thinning image processing so as to convert the image data of the applique cloth into image data in units of pixels forming lines (Step S108). It should be noted that the outline data may be extracted by means of image processing using an edge detection function.

Figure 13:
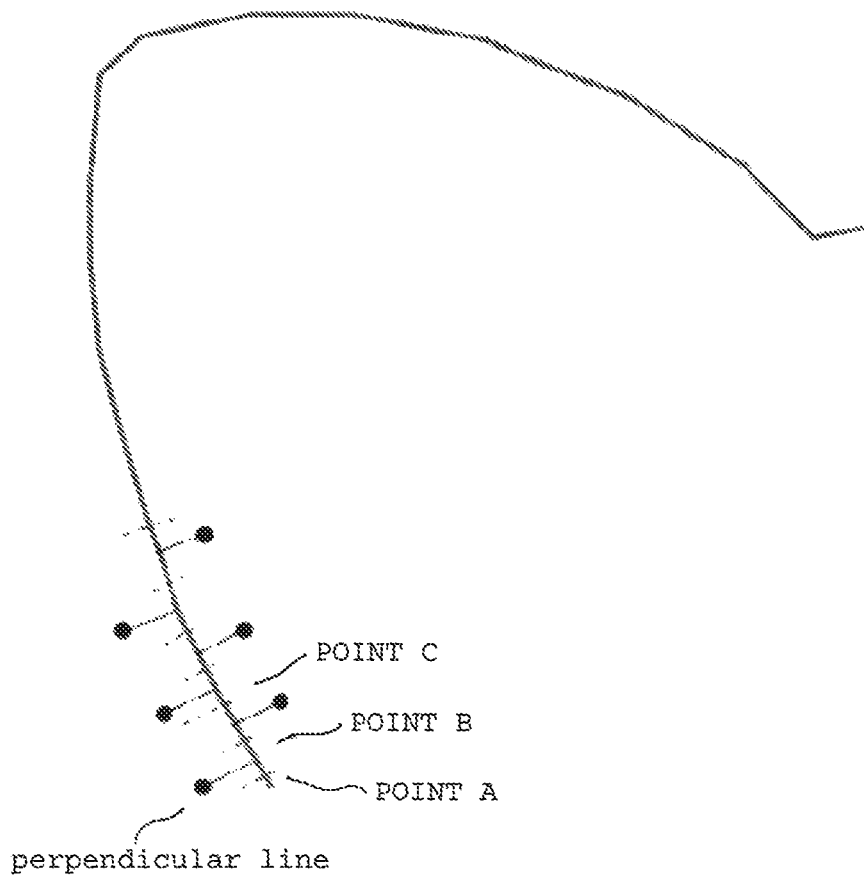
FIG. 13 is a diagram showing an example state according to the first embodiment of the present invention in which stitching points are determined for the output line of the applique cloth.
Figure 14:
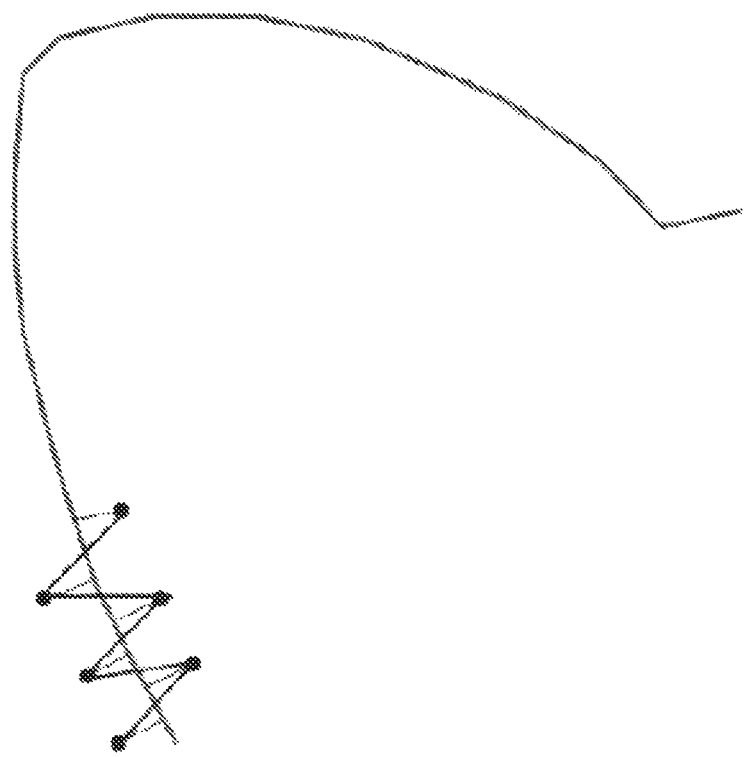
FIG. 14 is a diagram showing an example state according to the first embodiment of the present invention in which a zig-zag stitching pattern is formed on the applique cloth.

The user specifies a start point for a zig-zag stitching operation (Step S109). After the start point for the zig-zag stitching operation is specified, a zig-zag stitching pattern is generated from the start point thus specified, for example (Step S110). In this case, the zig-zag stitching operation is performed as shown in FIGS. 13 and 14, for example. That is to say, the coordinate position is calculated for each of points A and B arranged at an interval of 0.2 mm. A perpendicular line is defined for the line A-B, and a point on the line A-B 2.0 mm away from the outline is determined as a needle location point. In the same way, a perpendicular line is defined for the line B-C in a direction that is opposite to the perpendicular line defined for the line A-B, so as to calculate the next needle location point. The subsequent coordinate positions are sequentially determined such that the adjacent needle location points are opposite to each other across the outline. After the sewing data for sewing the applique cloth is generated according to the aforementioned procedure, the transmission unit 26 of the tablet terminal 20 transmits the sewing data to the reception unit 12 of the sewing machine 10 (Step S111).

[Effects of the Present Embodiment]

As described above, with the present embodiment, after a base cloth to which an applique cloth has been temporarily bonded by means of an adhesive agent or the like is stretched over an embroidery frame having a known size, an image of the base cloth is acquired together with the appearance of the embroidery frame. Thus, such an arrangement is capable of acquiring image magnification factor information, and of extracting the outline of the applique cloth from the image. Furthermore, such an arrangement generates sewing data for zig-zag stitches or the like to be formed along the outline thus extracted. By using such sewing data, such an arrangement only requires the user to mount the embroidery frame with the base cloth on the sewing machine to provide accurate zig-zag switching along the outline of the applique cloth. That is to say, such an arrangement allows the applique cloth to be sewn to the base cloth at an accurate position with stitching along the outline of the applique cloth without a need to prepare dedicated data beforehand.

[Second Embodiment]

Description will be made with reference to FIGS. 15 through 18 regarding a sewing system according to a second embodiment.

In some cases, the base cloth or the applique cloth has a pattern. In this case, in the operation in which the outline of the applique cloth is extracted, unnecessary lines are extracted at the same time. Alternately, the outline is transformed into a broken line or the like after the image processing. As a result, in some cases, this leads to issues. Examples of such issues include: an issue in that the outline thus extracted is not configured as a closed loop; and an issue in that the stitching pattern deviates from the outline of the applique cloth thus extracted. The sewing system according to the present embodiment provides the sewing system according to the first embodiment with a function of correcting the outline or a function of allowing the user to edit the outline. Detailed description will be made below regarding such an arrangement.

[Configuration of the Sewing System]

Figure 15:
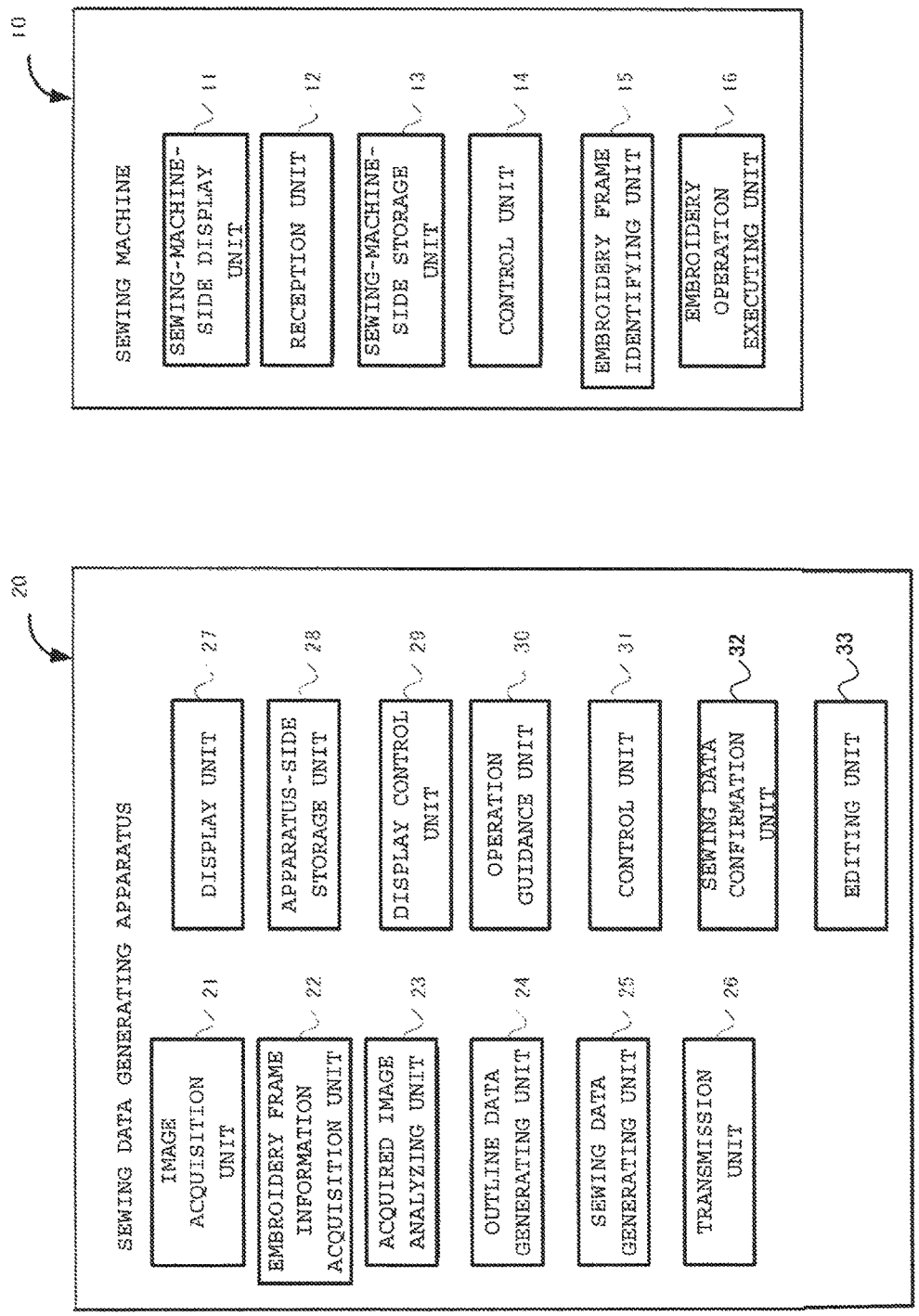
FIG. 15 is a diagram showing an electrical operation of a sewing system according to a second embodiment of the present invention.

As shown in FIG. 15, the sewing machine 10 comprises a sewing-machine-side display unit 11, a reception unit 12, and a sewing-machine-side storage unit 13, a sewing-machine-side control unit 14, an embroidery frame identifying unit 15, and a sewing operation executing unit 16. Moreover, as shown in FIG. 15, the tablet terminal 20 comprises an image acquisition unit 21, an embroidery frame information acquisition unit 22, an acquired image analyzing unit 23, an outline data generating unit 24, a sewing data generating unit 25, a transmission unit 26, a display unit 27, an apparatus-side storage unit 28, a display control unit 29, an operation guidance unit 30, an apparatus-side control unit 31, a sewing data confirmation unit 32, and an editing unit 33. It should be noted that the components denoted by the same reference symbols as in the first embodiment have the same functions as those in the first embodiment. Accordingly, detailed description thereof will be omitted.

The sewing data confirmation unit 32 instructs the display unit 27 to display an image including a sewing target acquired by the image acquisition unit 21 together with a planned sewing line generated based on the sewing data generated by the sewing data generating unit 25, in order to prompt the user to confirm the sewing plan. Furthermore, the sewing data confirmation unit 32 displays the planned sewing line with a color that can be easily identified visually with respect to the colors in the image including the sewing target. The editing unit 33 edits the outline data according to an instruction input by the user.

[Operation of the Sewing System]

Figure 16:
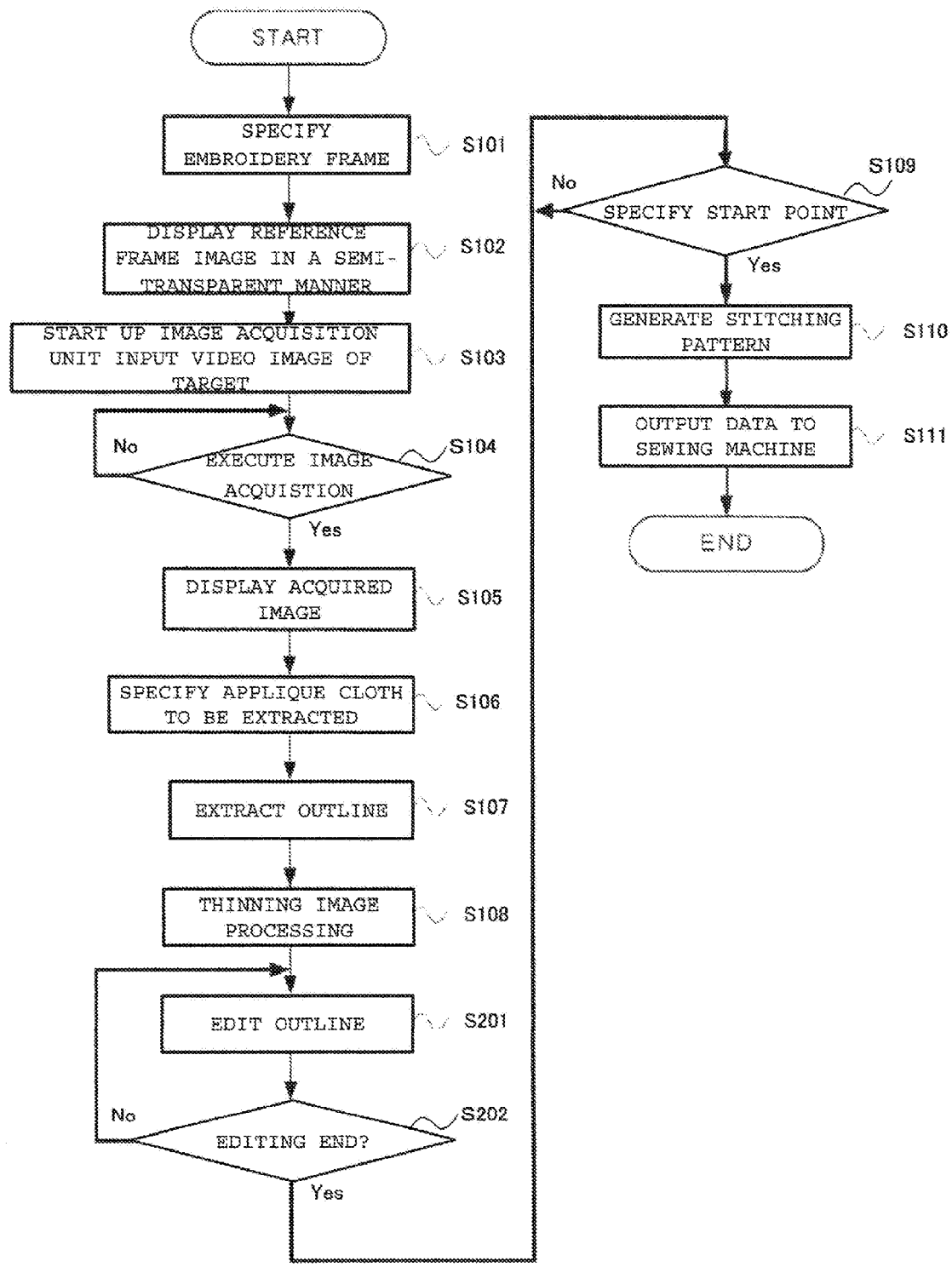
FIG. 16 is a diagram showing an electrical operation of the sewing system according to the second embodiment of the present invention.
Figure 17:
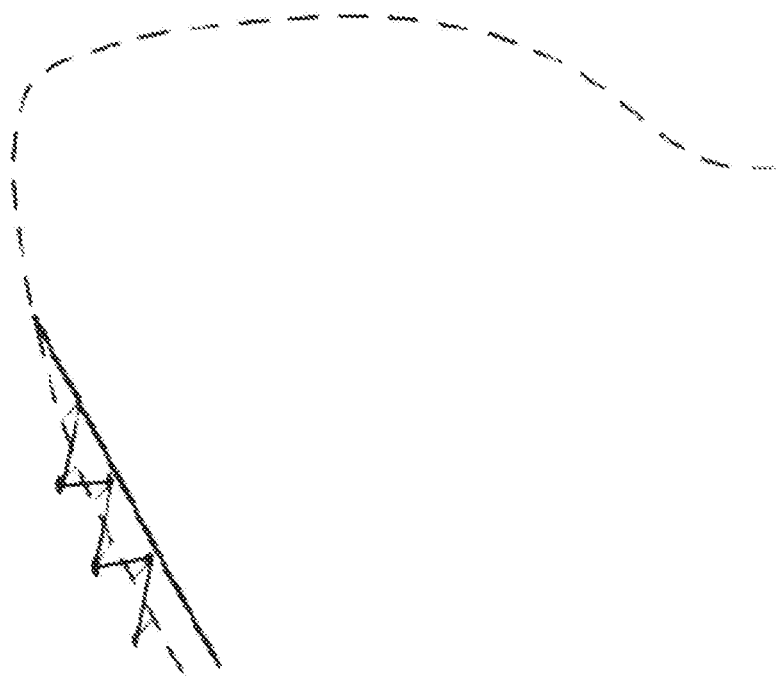
FIG. 17 is a diagram showing a confirmation image for the sewing data according to the second embodiment of the present invention.
Figure 18:
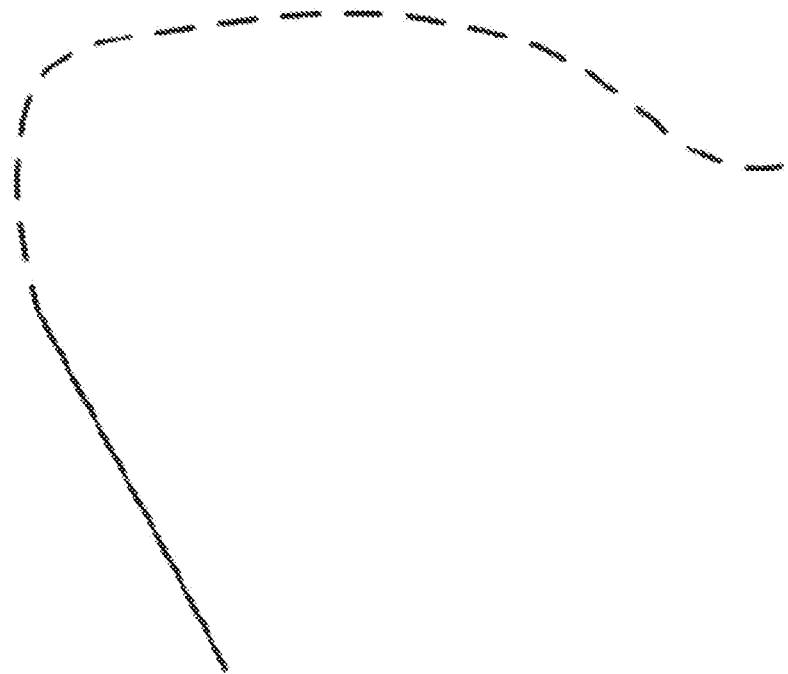
FIG. 18 is a diagram showing the confirmation image for the sewing data in an editing operation according to the first embodiment of the present invention.

Description will be made with reference to FIGS. 16 through 18 regarding the operation of the sewing system according to the present embodiment. It should be noted that the operation according to the present embodiment is executed as an intermediate step between the thinning image processing step according to the first embodiment and the step in which the user specifies the start point. At least the flow up to the thinning image processing step is the same as that in the first embodiment. Accordingly, detailed description thereof will be omitted.

When the thinning image processing ends in Step S108, the sewing data confirmation unit 32 is started up. The sewing data confirmation unit 32 displays a planned sewing line (represented by the dotted line in the drawing). In this step, when an unnecessary line is displayed or otherwise when the outline is not configured as a closed loop, the user edits the image using a finger or a dedicated pen so as to remove such an unnecessary line or to draw an additional line such that the outline is configured as a closed loop (Step S201). Furthermore, as shown in FIG. 17, in addition to the planned sewing line, a stitch pattern is displayed in a color that can be easily identified visually with respect to the colors in the image including the sewing target. Thus, when the stitch pattern deviates from the outline of the applique cloth (represented by the solid line in the drawing), such an arrangement allows the user to edit the outline data such that it matches the outline of the applique cloth as shown in FIG. 18. Moreover, when a smooth outline is not displayed, such an arrangement may be configured to allow the user to perform an operation such as pinching, dragging, or the like, on a desired portion of a line or a curve in order to edit the outline data. After the editing ends, the flow transits to the step in which the user specifies the start point (Step S202).

[Effects of the Present Embodiment]

As described above, with the present embodiment, after a base cloth to which an applique cloth has been temporarily bonded by means of an adhesive agent or the like is stretched over an embroidery frame having a known size, an image of the base cloth is acquired together with the external appearance of the embroidery frame. Thus, such an arrangement is capable of acquiring image magnification factor information. At the same time, such an arrangement is capable of acquiring the outline of the applique cloth in the form of an image. Furthermore, the outline data of the applique cloth is extracted by means of image processing. After the outline data is edited, the outline data thus edited and the outline of the applique cloth are displayed in a superimposed manner. Thus, by executing the embroidery operation after the user mounts the embroidery frame with the base cloth on the sewing machine in a state in which the applique cloth has been temporarily bonded to the base cloth, such an arrangement provides accurate zig-zag sewing along the outline of the applique cloth without a need to hold dedicated data beforehand. Moreover, such an arrangement generates the embroidery data to be used to sew the applique cloth after the applique cloth is mounted. Thus, such an arrangement flexibly supports accurate sewing of various kinds of applique cloths even if the user freely cuts the applique cloth or intentionally cuts the applique cloth with a different design.

[Modification]

Figure 3:
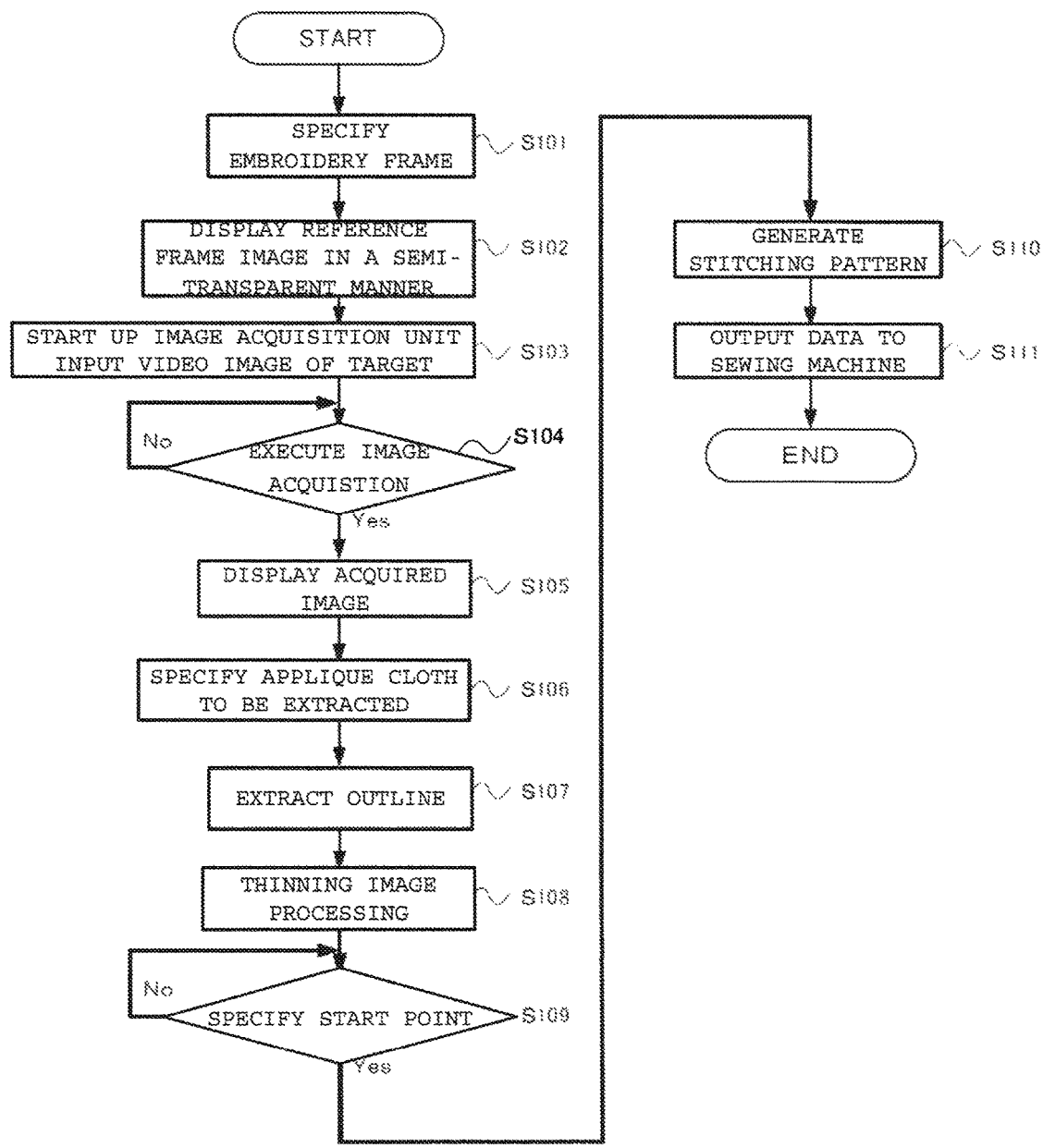
FIG. 3 is a diagram showing an electrical operation of the sewing system according to the first embodiment of the present invention.
Figure 4:
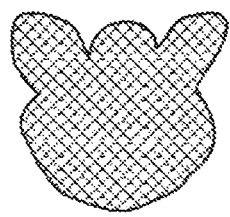
FIG. 4 is a diagram showing an example of an applique cloth according to the first embodiment of the present invention.
Figure 5:
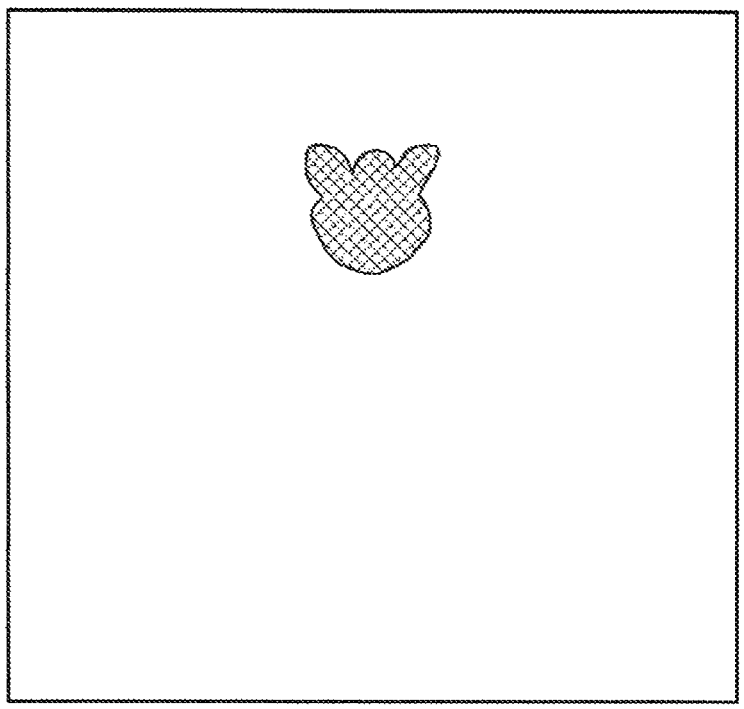
FIG. 5 is a diagram showing an example of a base cloth to which an applique cloth has been temporarily bonded according to the first embodiment of the present invention.
Figure 6:
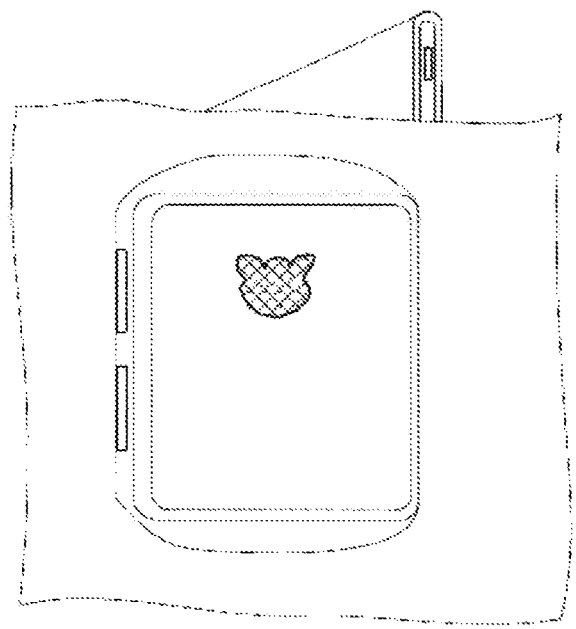
FIG. 6 is a diagram showing an example state according to the first embodiment of the present invention in which a base cloth to which an applique cloth has been temporarily bonded is mounted on an embroidery frame.

Description has been made in the first and second embodiments regarding an example in which the operations represented by Steps S102 through S107 shown in FIG. 3 are executed in a state in which a base cloth mounting an applique cloth is mounted on the embroidery frame, for example. However, when the base cloth has a similar color or otherwise a similar pattern to that of the applique cloth, in some cases, an issue can occur in extraction of the outline data of the applique.

In order to address such an issue, in the present modification, in a state in which only the base cloth is mounted on the embroidery frame, image acquisition is performed after the operations represented by Steps S102 through S107 shown in FIG. 3 are executed, for example. The acquired image data (first acquired image data) thus obtained is stored. Next, in a state in which the base cloth mounting the applique cloth is mounted on the embroidery frame, image acquisition is performed after the operations represented by Steps S102 through S107 shown in FIG. 3 are executed, for example. The acquired image data (second acquired image data) thus obtained is stored.

The difference between the first acquired image data and the second acquired image data thus stored is calculated by means of image processing. When a weak line or a useless image that occurs due to image acquisition error is detected in the difference calculation, noise removal is performed in order to generate the outline data of the applique cloth. Also, such an arrangement may allow the user to specify the applique image so as to acquire the outline data of the applique.

With the present modification, the difference between the first acquired image data and the second acquired image data is calculated. This allows the common image data in both the first acquired image data and the second acquired image data to be removed. Thus, such an arrangement is capable of accurately generating the outline data of the applique cloth even if the base cloth has a similar color or a similar pattern to that of the applique cloth.

[Third Embodiment]

Description has been made in the first and second embodiments for exemplary purposes regarding an arrangement in which the tablet terminal 20 configured as a sewing data generating apparatus generates the sewing data based on the outline data of the sewing target. Also, with another embodiment that differs from the aforementioned embodiments, an arrangement may be made in which the tablet terminal 20 generates the outline data of the sewing target, and the outline data thus generated is transmitted to the sewing machine 10. With such an arrangement, the sewing machine 10 may generate the sewing data for the sewing target based on the outline data thus received, and may perform a sewing operation for the sewing target according to the sewing data thus generated.

It should be noted that the operation of the sewing system or the sewing data generating apparatus may be recorded on a computer-system-readable or computer-readable recording medium in the form of a program. Also, such a program thus recorded may be read out and executed by the sewing system or the sewing data generating apparatus, thereby providing the sewing system or the sewing data generating apparatus according to the present invention. Examples of such a computer system or computer as used here include an operating system and a hardware component such as peripheral devices or the like.

Also, the "computer system" or "computer" encompasses website providing environments (or display environments) that employ the WWW (World Wide Web) system. Also, the aforementioned program may be transmitted to other computer systems or computers from a given computer system or computer that stores this program in its storage apparatus or the like via a transmission medium or otherwise transmission waves in the transmission medium. The "transmission medium" as used here to transmit a program represents a medium having a function of transmitting information, examples of which include networks (communication networks) such as the Internet and communication lines (communication wires) such as phone lines, etc.

Also, the aforementioned program may be configured to provide a part of the aforementioned function. Also, the aforementioned program may be configured as a so-called differential file (differential program), which is to be combined with a different program stored beforehand in a computer system or computer in order to provide the aforementioned function.

Detailed description has been made with reference to the drawings regarding the embodiment according to the present invention. However, such a specific configuration is not restricted to the embodiment. Rather, various kinds of changes in design or the like may be made without departing from the scope of the present invention.

REFERENCE SIGNS LIST

10 sewing machine
11 sewing-machine-side display unit
12 reception unit
13 sewing-machine-side storage unit
14 sewing-machine-side control unit
15 embroidery frame identifying unit
16 sewing operation executing unit
20 tablet terminal (sewing data generating apparatus)
21 image acquisition unit
22 embroidery frame information acquisition unit
23 acquired image analyzing unit
24 outline data generating unit
25 sewing data generating unit
26 transmission unit
27 display unit
28 apparatus-side storage unit
29 display control unit
30 operation guidance unit
31 apparatus-side control unit
32 sewing data confirmation unit
33 editing unit

What is claimed is:

1. A sewing data generating apparatus comprising:
an image acquisition unit that acquires an image of an embroidery frame and a sewing target mounted on a base cloth mounted on the embroidery frame;
an acquired image analyzing unit that analyzes the image acquired by the image acquisition unit based on a correspondence between information with respect to the embroidery frame and information with respect to the image of the embroidery frame acquired by the image acquisition unit;
an outline data generating unit that generates outline data for the sewing target analyzed by the acquired image analyzing unit;
an embroidery frame information acquisition unit that acquires information with respect to the embroidery frame;
a display control unit that instructs a display unit to display a reference frame image that corresponds to the embroidery frame based on the information with respect to the embroidery frame acquired by the embroidery frame information acquisition unit; and
an operation guidance unit that instructs a user to acquire an image in a state in which the reference frame image that corresponds to the embroidery frame displayed on the display unit is aligned with an image of the embroidery frame acquired via the image acquisition unit and displayed on the display unit,
wherein the acquired image analyzing unit analyzes a correspondence between the information with respect to the embroidery frame and the information with respect to the image of the embroidery frame in a state in which the reference frame image that corresponds to the embroidery frame is aligned with the image of the embroidery frame acquired by the image acquisition unit.

2. The sewing data generating apparatus according to claim 1, comprising a sewing data generating unit that generates sewing data for the sewing target based on the outline data generated by the outline data generating unit.

3. The sewing data generating apparatus according to claim 2, comprising a transmission unit that transmits the sewing data, which is generated by the sewing data generating unit for the sewing target, to a sewing machine.

4. The sewing data generating apparatus according to claim 1, wherein the reference frame image that corresponds to the embroidery frame is displayed on the display unit in a semi-transparent manner.

5. The sewing data generating apparatus according to claim 1, wherein the operation guidance unit provides at least one from among a guidance display and an audio guidance.

6. The sewing data generating apparatus according to claim 1, comprising a control unit,
wherein the control unit performs a control operation so as to instruct the image acquisition unit to automatically acquire an image at a time point at which judgement has been made that the image of the embroidery frame is aligned with the reference frame image that corresponds to the embroidery frame.

7. The sewing data generating apparatus according to claim 1, wherein the outline data generating unit performs image processing on an image including the embroidery frame and the sewing target mounted on the base cloth mounted on the embroidery frame acquired by the image acquisition unit, so as to generate outline data for the sewing target.

8. The sewing data generating apparatus according to claim 2, comprising a sewing data confirmation unit that instructs the display unit to display an image of the sewing target acquired by the image acquisition unit and a planned sewing line generated based on the sewing data generated by the sewing data generating unit.

9. The sewing data generating apparatus according to claim 8, wherein the sewing data confirmation unit displays the planned sewing line in a color that can be easily identified visually with respect to colors in the image including the sewing target.

10. The sewing data generating apparatus according to claim 1, comprising an editing unit that edits the outline data according to an operation by a user.

11. A sewing data generating method employed in a sewing data generating apparatus comprising an image acquisition unit, an acquired image analyzing unit, an outline data generating unit, an embroidery frame information acquisition unit, a display control unit, and an operation guidance unit, the sewing data generating method comprising:
acquiring, by the image acquisition unit, an image of an embroidery frame and a sewing target mounted on a base cloth mounted on the embroidery frame;
analyzing, by the acquired image analyzing unit, the image acquired by the image acquisition unit based on a correspondence between information with respect to the embroidery frame and information with respect to the image of the embroidery frame acquired by the image acquisition unit;
generating, by the outline data generating unit, the outline data for the sewing target analyzed by the acquired image analyzing unit;
acquiring, by the embroidery frame information acquisition unit, information with respect to the embroidery frame;
instructing, by the display control unit, a display unit to display a reference frame image that corresponds to the embroidery frame based on the information with respect to the embroidery frame acquired by the embroidery frame information acquisition unit; and
instructing, by the operation guidance unit, a user to acquire an image in a state in which the reference frame image that corresponds to the embroidery frame displayed on the display unit is aligned with an image of the embroidery frame acquired via the image acquisition unit and displayed on the display unit,
wherein the acquired image analyzing unit analyzes a correspondence between the information with respect to the embroidery frame and the information with respect to the image of the embroidery frame in a state in which the reference frame image that corresponds to the embroidery frame is aligned with the image of the embroidery frame acquired by the image acquisition unit.

12. A sewing system comprising a sewing data generating apparatus and a sewing machine, wherein the sewing data generating apparatus comprises:
an image acquisition unit that acquires an image of an embroidery frame and a sewing target mounted on a base cloth mounted on the embroidery frame;
an acquired image analyzing unit that analyzes the image acquired by the image acquisition unit based on a correspondence between information with respect to the embroidery frame and information with respect to the image of the embroidery frame acquired by the image acquisition unit;
an outline data generating unit that generates outline data for the sewing target analyzed by the acquired image analyzing unit; and
a transmission unit that transmits, to the sewing machine, the outline data generated by the outline data generating unit or otherwise sewing data for the sewing target generated based on the outline data,
wherein the sewing machine comprises:
a reception unit that receives the outline data or otherwise the sewing data transmitted from the transmission unit;
a sewing operation execution unit that executes sewing for the outline of the sewing target according to the outline data or otherwise the sewing data received by the reception unit;
an embroidery frame information acquisition unit that acquires information with respect to the embroidery frame;
a display control unit that instructs a display unit to display a reference frame image that corresponds to the embroidery frame based on the information with respect to the embroidery frame acquired by the embroidery frame information acquisition unit; and
an operation guidance unit that instructs a user to acquire an image in a state in which the reference frame image that corresponds to the embroidery frame displayed on the display unit is aligned with an image of the embroidery frame acquired via the image acquisition unit and displayed on the display unit, and
wherein the acquired image analyzing unit analyzes a correspondence between the information with respect to the embroidery frame and the information with respect to the image of the embroidery frame in a state in which the reference frame image that corresponds to the embroidery frame is aligned with the image of the embroidery frame acquired by the image acquisition unit.

* * * * *